United States Patent [19]
Hoshino

[11] Patent Number: 5,688,069
[45] Date of Patent: Nov. 18, 1997

[54] JOINT STRUCTURE OF STRUCTURAL MEMBERS

[76] Inventor: Juichi Hoshino, No. 2453-8 Kuragano-cho, Takasaki-shi, Gunma-ken 370-12, Japan

[21] Appl. No.: 672,223

[22] Filed: Jul. 5, 1996

[51] Int. Cl.⁶ ......................................................... F16B 9/02
[52] U.S. Cl. ........................ 403/340; 403/339; 403/333
[58] Field of Search ................................ 403/339, 340, 403/407.1, 333, 334, 331, 405.1, 364, 230

[56] References Cited

U.S. PATENT DOCUMENTS

| | | | |
|---|---|---|---|
| 317,155 | 5/1885 | Lowrie | 403/339 |
| 925,293 | 6/1909 | Cheney | 403/340 |
| 1,003,973 | 9/1911 | Barrickman | 403/340 |
| 3,659,490 | 5/1972 | Buck | 403/339 X |
| 4,344,718 | 8/1982 | Taylor | 403/339 X |

FOREIGN PATENT DOCUMENTS

| | | | |
|---|---|---|---|
| 780702 | 5/1935 | France | 403/339 |
| 1502148 | 11/1967 | France | 403/340 |

Primary Examiner—Harry C. Kim
Attorney, Agent, or Firm—Burns, Doane, Swecker & Mathis LLP

[57] ABSTRACT

A joint structure has a male-side metal joint (3) fixed on a column (1) and a female-side metal joint (4) fixed on a beam (2). The two metal joint (3, 4) are common joints having the same shape, and have a first contacting surface (81), a second contacting surface (82) which continues from the back thereof and curves upward at an angle of less than 90°, and a third contacting surface (83) which continues from the front of the first contacting surface and curves downward at an angle of 270° or more. When one of the two metal joints (3, 4) is put on the other, these contacting surfaces contact intimately with each other. If the two joints are fastened by a fastening bolt (5) in this state, the beam (2) is jointed to the column (1). Because the first to third contacting surfaces (81 to 83) incline, the joint metals (3, 4) do not get out of place longitudinally or vertically. Hence the simple subsequent operation of fastening and so forth can be carried out easily.

2 Claims, 9 Drawing Sheets

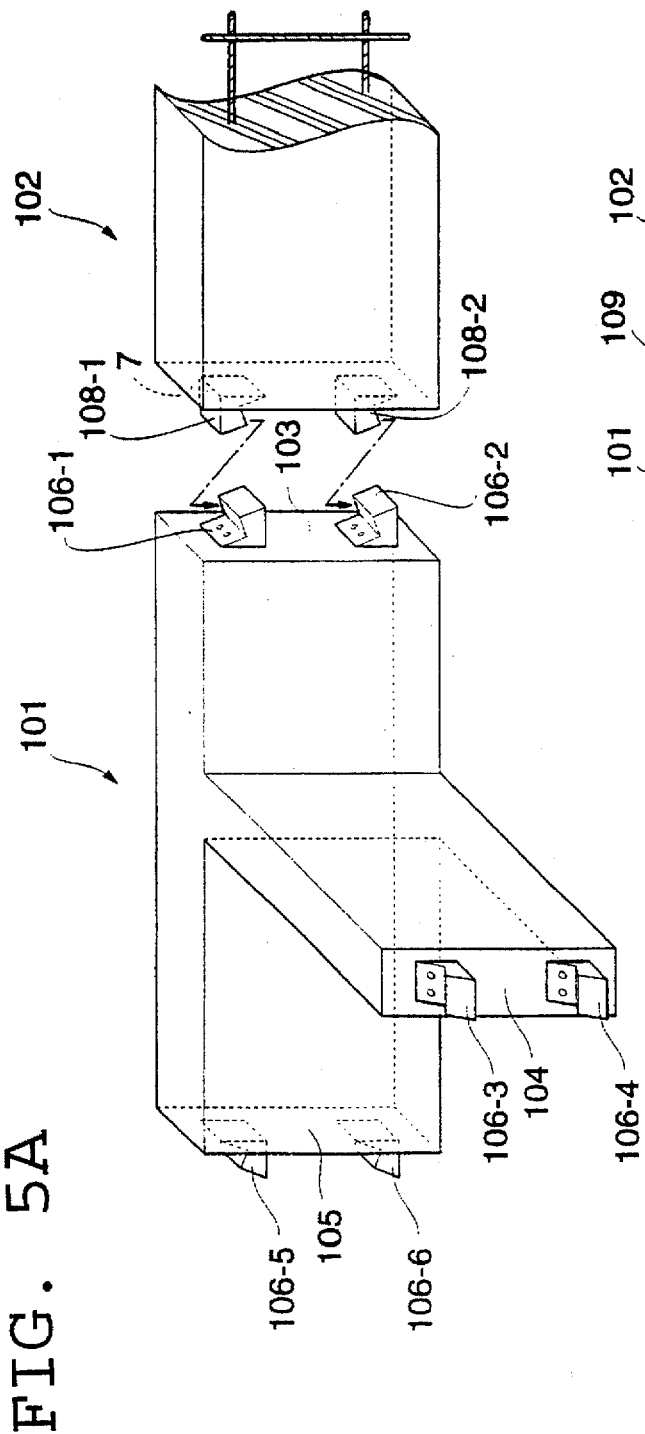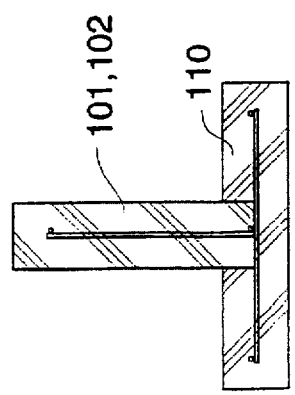

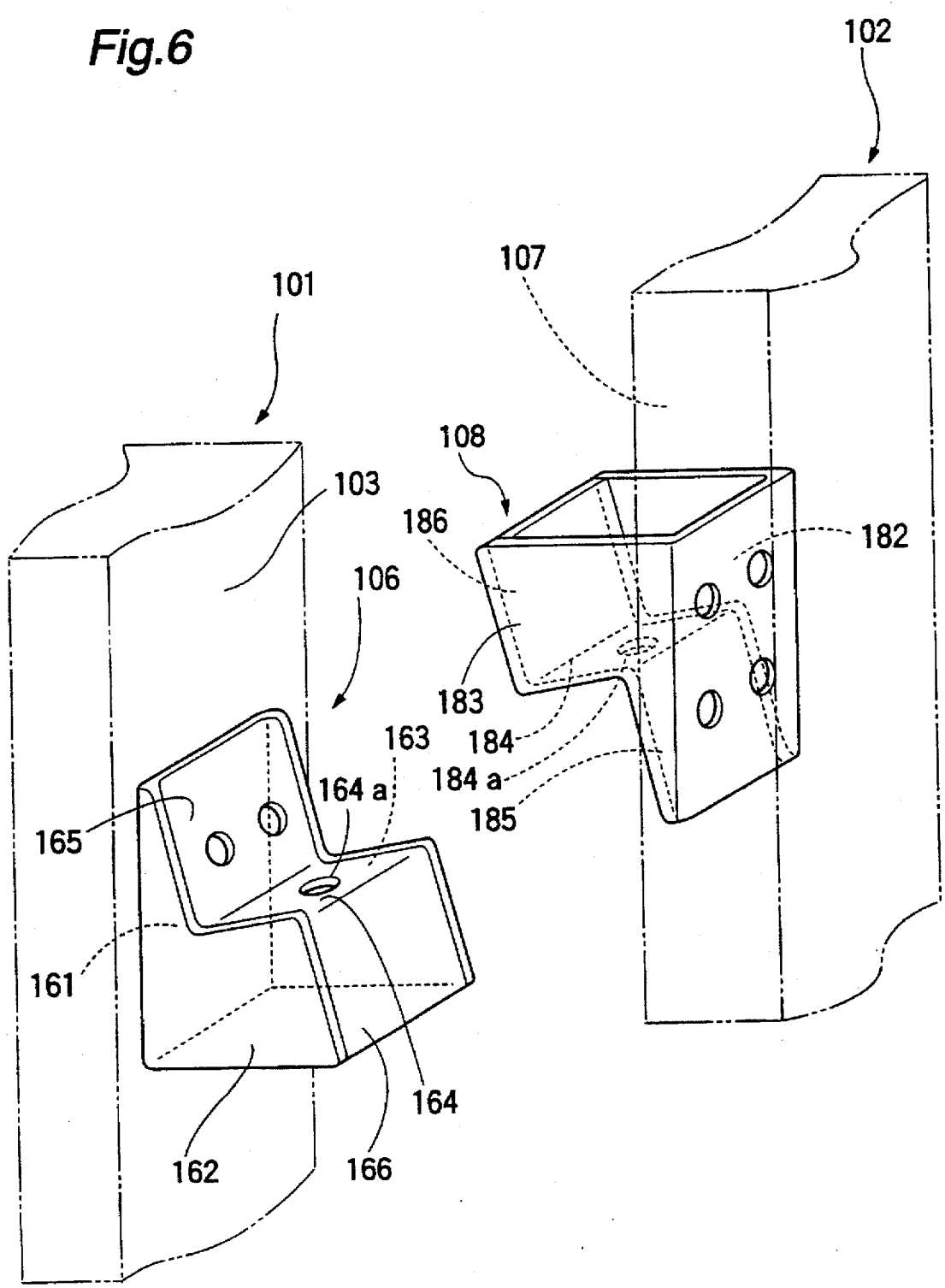

FIG. 9A
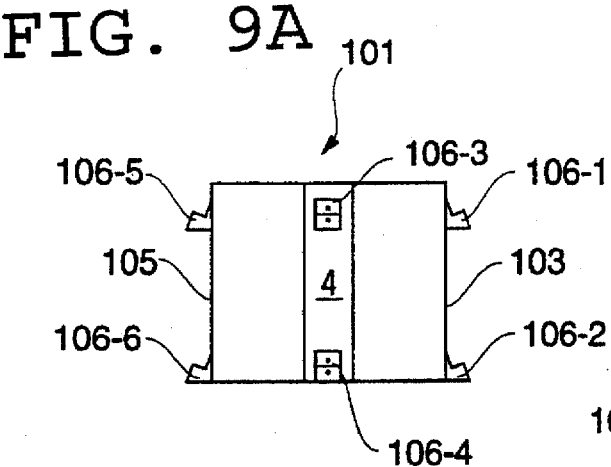
FIG. 9B
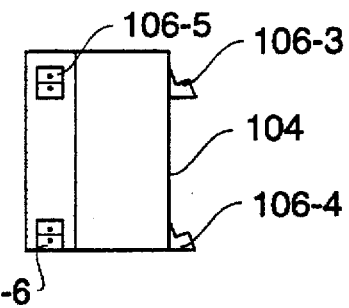
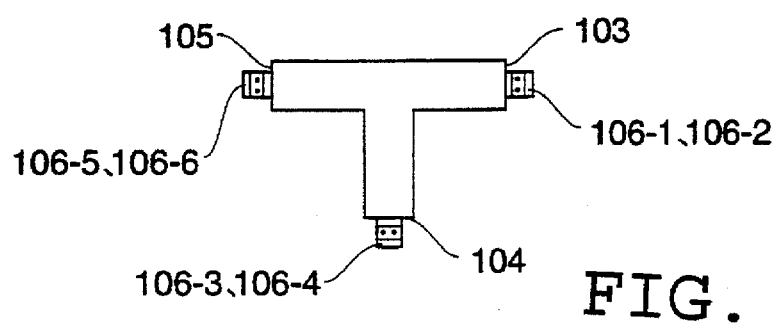
FIG. 9C
FIG. 10A
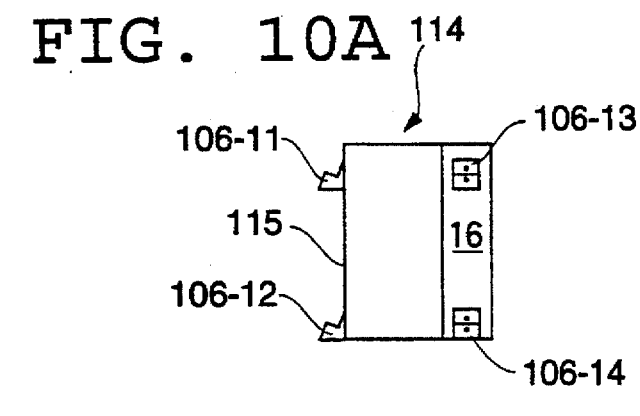
FIG. 10B
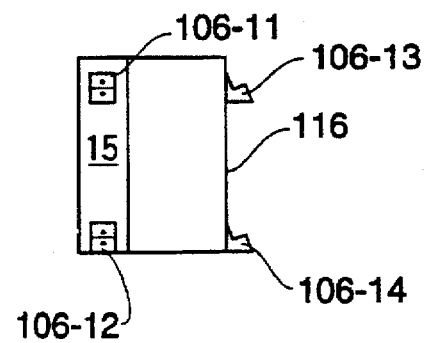
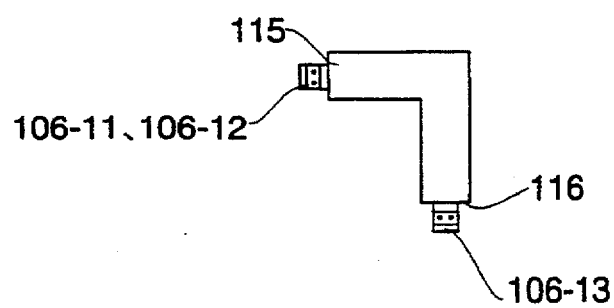
FIG. 10C

JOINT STRUCTURE OF STRUCTURAL MEMBERS

BACKGROUND OF THE INVENTION

This invention relates to a joint structure to joint wooden or steel members to each other. This invention also relates to joints used in the joint structure. Furthermore, this invention relates to a joint structure of precast concrete footings when a foundation of a wooden house and so forth is constructed by means of the precast concrete footings.

RELATED ART STATEMENT

In the case of wooden houses, light-steel houses and so forth, columns and beams thereof are jointed to one another by these members being connected or by means of reinforcement members such as gusset plates.

When the foundation of wooden houses and so on is constructed by means of precast concrete footings produced in a factory, the precast concrete footings are carried to the building site and installed there, and then concrete is placed in the joint portion of these precast concrete footings so that the footings may be jointed.

As described above, in the case of the frame construction, foundation construction and so forth of structures such as wooden houses, the joint operation of component members is carried out in the building site. Accordingly, this operation requires skilled workers. Since this operation is done manually, high reliability cannot be expected, and in addition, the term of works is prolonged and costs such as payroll increase.

Considering the above problems, the object of this invention is to realize a reliable joint structure of members in a simple operation.

SUMMARY

In order to solve the aforementioned problems, this invention realizes a joint structure of members to joint different members to each other, which has a male-side joint to be fixed on the side of one member, a female-side joint to be fixed on the side of the other member, and a fastener to fasten and fix said male-side joint and said female-side joint; said male-side joint has the first contacting surface, the second contacting surface which continues from the back side of the first contacting surface and extends at a certain angle, and the third contacting surface which continues from the front side of the first contacting surface and extends at a certain angle, and said female-side joint has the first to third contacted surfaces which correspond to said first to third contacting surfaces; these contacted surfaces can be put closely on the corresponding first to third contacting surfaces at the same time; and said first and second members are jointed when the first to third contacted surfaces of the female-side joint fixed on one member are put closely on the first to third contacting surfaces of the male-side joint fixed on the other member, and next the male-side joint and the female-side joint are fastened and fixed by means of said fastener.

It is desirable that the male-side joint have the first contacting surface, the second contacting surface which continues from the back side of the first contacting surface and extends at an angle of less than 90°, and the third contacting surface which continues from the front side of the first contacting surface and extends at an angle of 270° or more.

Further, it is desirable that the female-side joint have the first to third contacted surfaces which correspond to the first to third contacting surfaces and that these contacted surfaces have the composition which enables these contacted surfaces to be put closely on the corresponding first to third contacting surfaces at the same time.

In the joint structure of members according to this invention, two members can be jointed in a simple operation of putting the first to third contacted surfaces of the female-side joint fixed on one member on the first to third contacting surfaces of the male-side joint fixed on the other member, and of fastening these joints by means of a fastener. When the female-side joint is put on the male-side joint, because the three inclined surfaces overlap as described above, the position in the two directions, or longitudinal and vertical directions is determined automatically. Hence the simple subsequent operation of fastening and so forth.

Incidentally, in order to prevent the two joints from getting out of place laterally, the following constitution may be added to the above constitution. That is, the male-side joint may have left and right sidewalls extending perpendicularly from both sides of the first to third contacting surfaces, and part of one of the sidewalls may be a projected wall which projects from each of the first to third contacting surfaces. While, the female-side joint may have left and right sidewalls extending perpendicularly from both sides of the first to third contacted surfaces, and part of one of the sidewalls may be a projected wall which projects from each of the first to third contacted surfaces.

In addition, when the female-side joint is put closely on the male-side joint, the projected surface of the male-side joint may be engaged with the side of the female-side joint where there is not a projected surface, and the projected surface of the female-side joint may be engaged with the side of the male-side joint where there is not a projected surface.

The constitution described above prevents the joints from getting out of place laterally because the projecting surface of one joint touches the side of the other joint.

Next, the two joints are fastened by means of a fastener which is put through fastening holes for that fastener made in the first contacting surface of the male-side joint and the first contacted surface of the female-side joint.

It is generally desirable that the male-side joint and the female-side joint have the same shape in view of reduction of the number of parts and of workability. In other words, it is desirable that the male-side joint and the female-side joint be composed as common joints.

In another aspect of this invention, there is provided a joint structure of precast concrete footings which are produced in advance in a factory so that the footings may have a certain length and shape, are carried to the building site and then are jointed to each other to constitute a continuous footing for houses; comprising at least one male-side joint fixed on the end surface of the first precast concrete footing, and at least one female-side joint fixed on the end surface of the second precast concrete footing to be jointed to the first precast concrete footing. The male-side joint has an inclined contacting surface whose front rises in the longer direction of the footing, while the female-side joint has a contacted surface which adheres to the contacting surface when the female-side joint is put on the male-side joint from above. After the first and second precast concrete footings are jointed so that the male-side joint and the female-side joint may overlap, concrete is placed in the joint portion between the two footings to unite the footings.

It is desirable that the male-side joint and the female-side joint be joints which can be used in common having the same shape because then the number of parts can be reduced and the joints can be handled easily.

In the case of the joint structure of a precast concrete footing according to this invention as described above, after the first precast concrete footing is installed in a given position, when the second precast concrete footing is installed so that the female-side joint fixed on the end surface of the second precast concrete footing may overlap from above the male-side joint on the side of the first precast concrete footing, the first and second precast concrete footings are jointed and do not move away from each other. If the precast concrete footings are jointed and installed successively and then concrete is placed in each joint portion, the joint portion is united, and thus the construction of the continuous footing is completed. Hence an extremely simple construction of the continuous footing by means of the precast concrete footing.

BRIEF DESCRIPTION OF THE DRAWINGS

FIG. 5 illustrates the joint structure of the precast concrete footing to which this invention is applied, in which (A) is a perspective view of a precast concrete footing for T-joints, (B) is a perspective view of a precast concrete footing for beams, while (C) is a sectional view of a continuous footing after the base is placed;

FIG. 6 is a perspective view of the male-side and female-side metal joints in FIG. 5;

FIGS. 9A–9C include a front view, a side view and a plan view of the precast concrete footing for T-joints; and FIGS. 10A–10C include a front view, a side view and a plan view of the precast concrete footing for L-joints.

DESCRIPTION OF THE PREFERRED EMBODIMENTS

The joint structure of the members to which this invention is applied will be described below with reference to the attached drawings.

FIRST EXAMPLE

Figure 1:
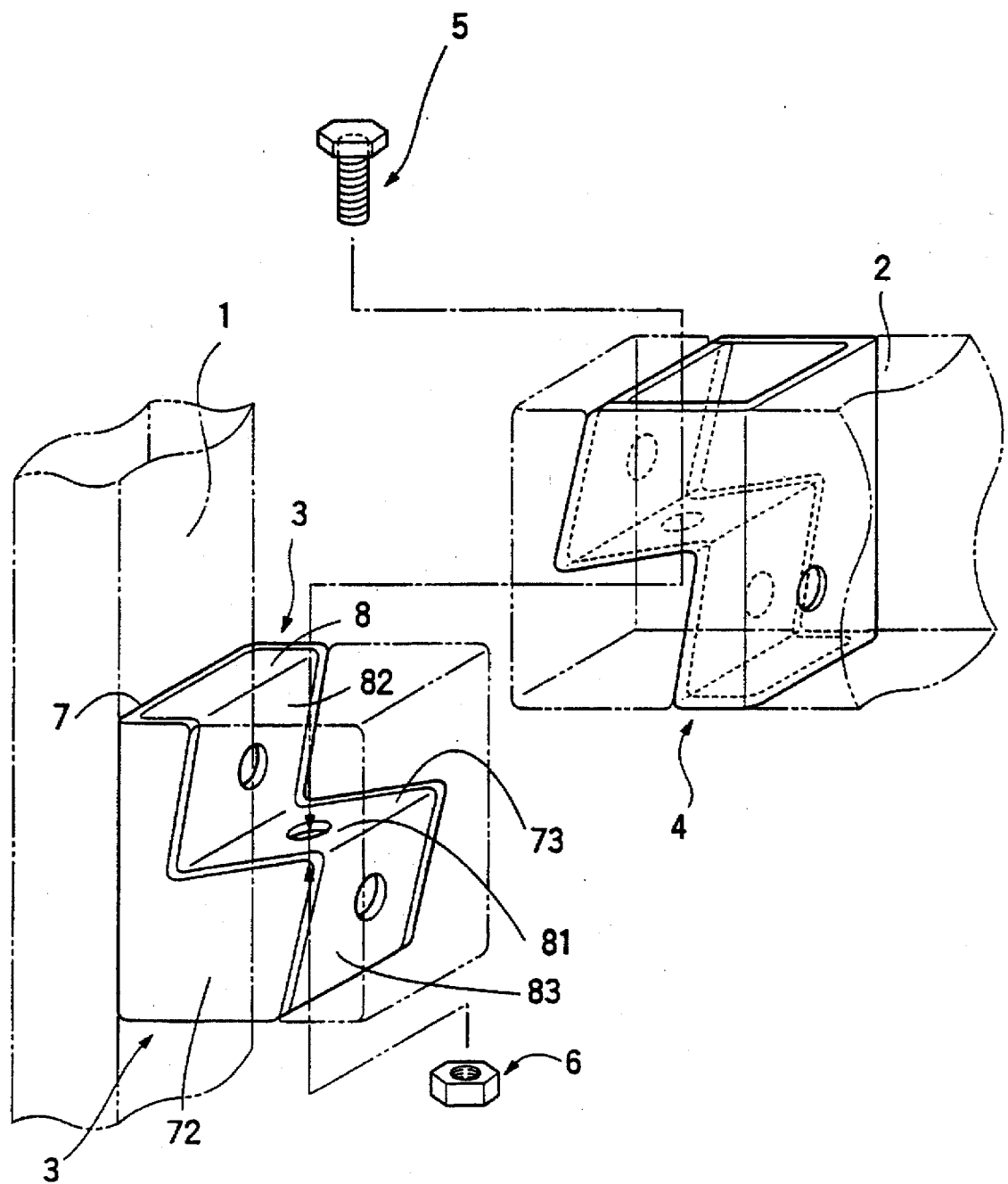
FIG. 1 illustrates the joint structure of the members to which this invention is applied.

FIG. 1 shows an example in which this invention is applied to the joint of a column and a beam of a light-steel building. In this drawing, a reference number 1 is a column of a square pipe made of light steel, and a reference number 2 is a beam also of a square pipe made of light steel. To the side of the column 1, a male-side metal joint 3 to which this invention is applied is attached by means of welding and so on. To the connection of the column 2, a female-side metal joint 4 to which this invention is applied is attached by means of welding and so on. These male-side metal joint 3 and female-side metal joint 4 are fastened to each other by a fastening bolt 5 and a nut 6.

Figure 2:
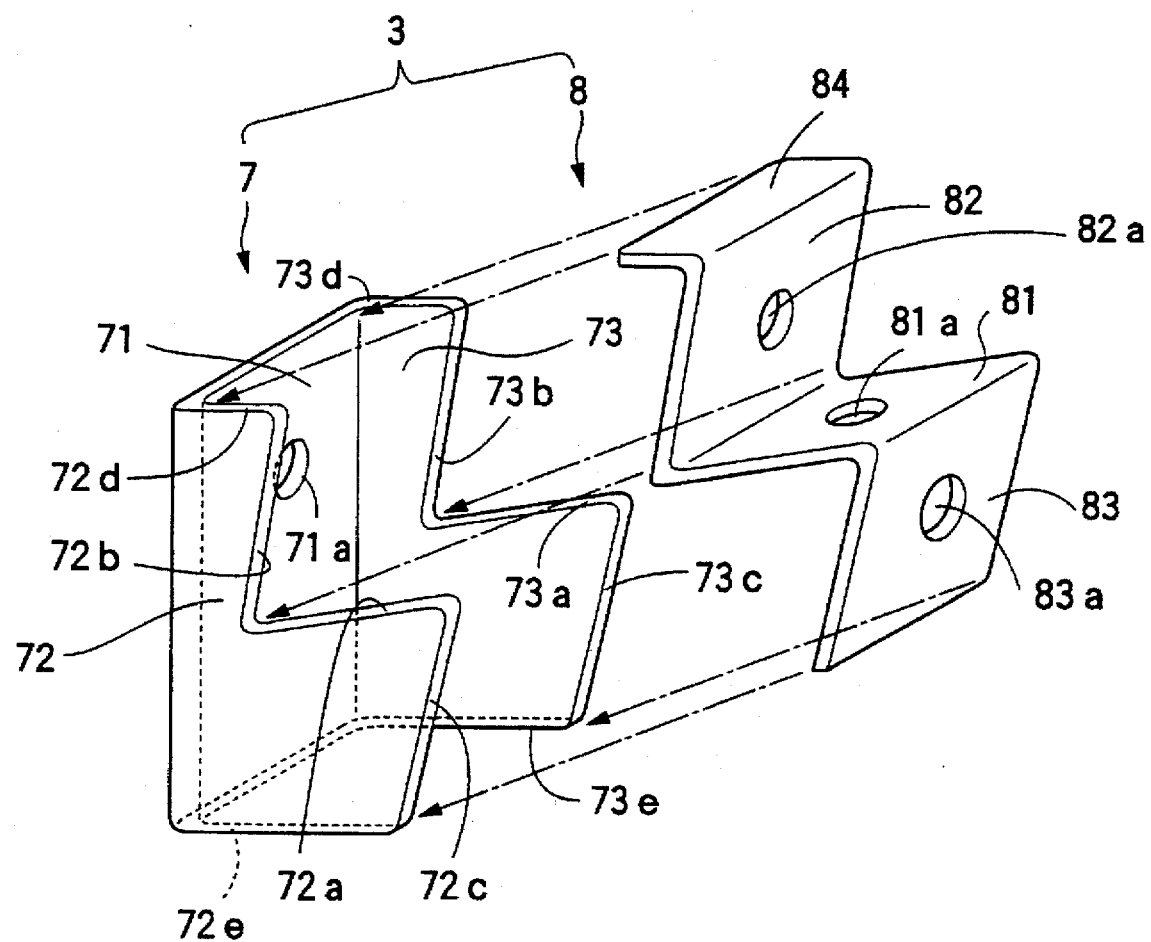
FIG. 2 is an exploded perspective view of a male-side metal joint in FIG. 1.

FIG. 2 is an exploded perspective view of the male-side metal joint 3. The structure of the male-side metal joint 3 will be described with reference to FIGS. 1 and 2. The male-side metal joint 3 consists of a column-side metal piece 7 and a connection-side metal piece 8. The column-side metal piece 7 is folded steel and has a rectangular back wall 71, and left and right sidewalls 72 and 73 which extend forward perpendicularly from the left and right of the back wall 71.

A circular hole 71a is made in the upper center of the back wall 71. The left and right sidewalls 72 and 73 have the same shape, and have the first end surfaces 72a and 73a whose front portion inclines slightly upward with respect to the horizontal line; the second end surfaces 72b and 73b which continue from the back of the first end surfaces 72a and 73a, and extend upward at an angle of less than 90° and the third end surfaces 72c and 73c which join the front of the first end surfaces 72a and 73a, and extend downward at an angle of 270° or more. At the upper ends of the second end surfaces 72b and 73b are horizontal upper end surfaces 72d and 73d, and at the lower ends of the third end surfaces 72c and 73c are horizontal lower end surfaces 72e and 73e.

The connection-side metal piece 8, on the other hand, is made of a sheet of folded steel which is made in such a way as to have a shape conforming to the outline of the end surfaces of the left and right sidewalls 72 and 73. That is, the metal piece 8 has the first contacting surface 81 conforming to the first end surfaces 72a and 73a; the second contacting surface 82 conforming to the second end surfaces 72b and 73b; and the third contacting surface 83 conforming to the third end surfaces 72c and 73c. Accordingly, the second contacting surface 82 inclines upward at an angle of less than 90° with respect to the first contacting surface 81, and the third contacting surface 83 inclines downward at an angle of 270° or more. Incidentally, in this example, there is a level upper end surface 84 formed continuing from the upper end of the second contacting surface 82.

In the center of the first contacting surface 81 is a circular hole 81a for a fastening bolt. There are circular holes 82a and 83a in the center of the second and third contacting surfaces 82 and 83, respectively. The connection-side metal piece 8 having this structure is welded to the column-side metal piece 7.

While, the female-side metal joint 4, as shown in FIG. 1, has the same shape as the male-side metal joint 3. Accordingly, corresponding portions are given the same reference numbers in FIG. 1. Note that as shown in FIG. 1, the female-side metal piece 4 is fixed on the connection of the beam 2 upside down.

Figure 3A:
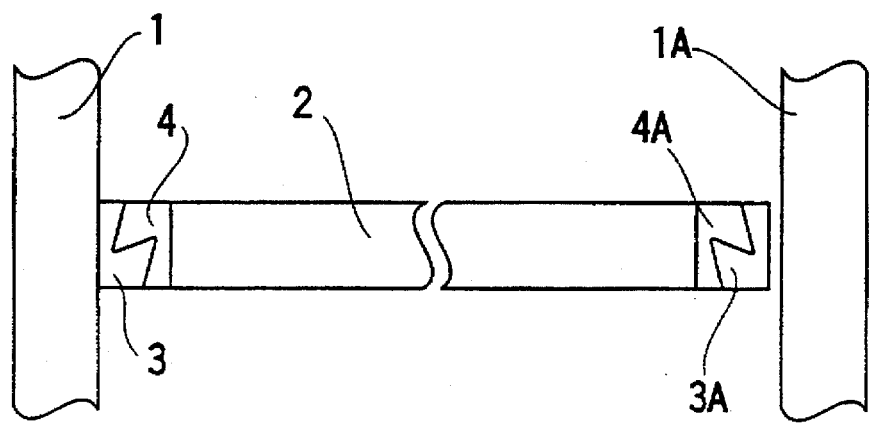
FIG. 3(A) illustrates the state in which a beam is laid between a pair of columns using the joint structure in FIG. 1.

FIG. 3(A) shows the state in which the beam 2 is laid between a pair of columns 1 and 1A, and fixed thereto. As shown in this drawing, male-side metal joints 3 and 3A are fixed symmetrically on the sides facing each other of the pair of columns 1 and 1A. Similarly, female-side metal joints 4 and 4A are fixed symmetrically on the left and right connections of the beam 2. Because the interval of the columns 1 and 1A, or the span of the beams is several meters, the beam can be moved laterally by several millimeters. Accordingly, if the beam 2 is placed from above between the pair of columns 1 and 1A, as shown in FIG. 3(A), the female-side metal joints 4 and 4A can be inserted forcedly into the male-side metal joints 3 and 3A on both sides of the beam.

Figure 3B:
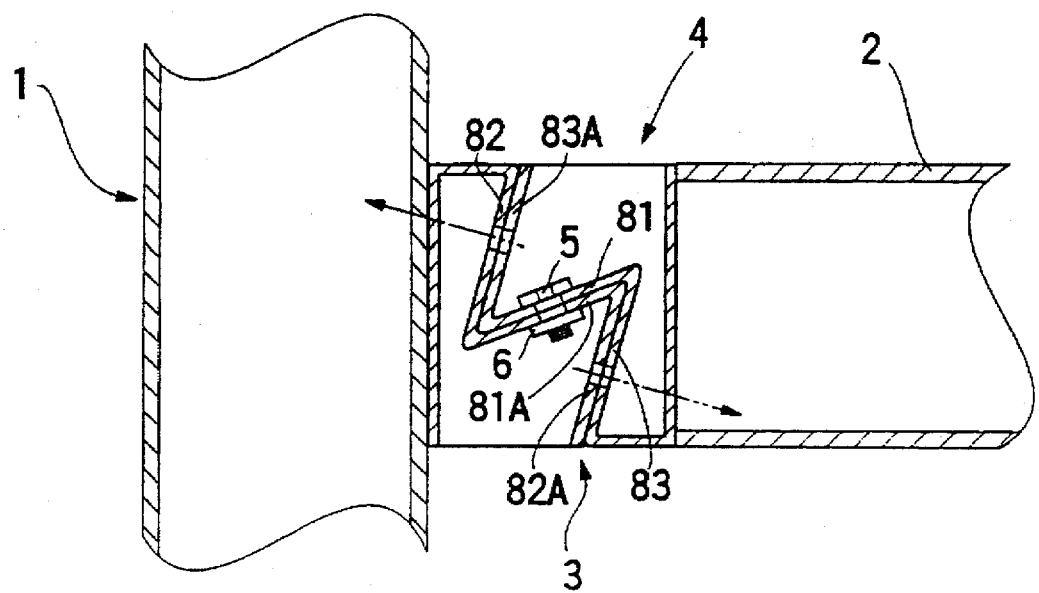
FIG. 3(B) is an enlarged partial sectional view of the joint of the columns and the beam.

FIG. 3(B) shows the female-side metal joint 4 put on the male-side metal joint 3 on one side. As can be seen from this drawing, the first, third and second contacting surfaces 81A, 83A and 82A on the side of the female-side metal joint 4 are intimately contacted to the first, second and third contacting surfaces 81, 82 and 83 of the male-side metal joint 3.

Incidentally, the first contacting surfaces 81 and 81A are inclined surfaces inclining toward the span (longitudinal) direction with respect to the horizontal direction. Accordingly, the pair of first contacting surfaces 81 and 81A are set into an overlap condition, which prevents the metal joints from getting out of place in the span direction. The second and third contacting surfaces 82 and 82A, and 83 and 83A incline so as to come close to the first contacting surfaces 81 and 81A toward the span direction. Thus these overlapping contacting surfaces prevent the metal joints from getting out of place vertically. In addition, since the beam 2 is forcedly placed between the columns 1 and 1A, the female-side metal joint 4 does not come off the male-side metal joint 3 easily.

After the metal joint 4 is placed on the metal joint 3, the fastening bolt 5 is inserted into the circular holes 81a in the first contacting surfaces 81 of the two metal joints, and then the nut 6 is fastened from the back. This fastening can be done easily because the metal joints 3 and 4 are prevented from getting out of place as described above.

As is clear from the above description, the column and the beam can be jointed in a simple operation if the metal joints 3 and 4 in this example are used.

(Modified Example of the Metal Joints)

FIG. 4 shows the metal joints according to another example of this invention. The basic structure of the metal joints 3B and 4B is the same as that of the metal joints 3 and 4 described above. The metal joints 3B and 4B, however, have projected walls 72f which are formed by the first end surface 72a and the second end surface 72b of one sidewall 72 being extended to the upper end surface 72d.

Accordingly, when overlapped, the male-side metal joint 3B and the female-side metal joint 4B are in a state shifted with each other by as much as the thickness of the projected walls 72f. In other words, in this state, the inside 72g of the projected wall 72f on one side abuts the sidewall 72 on the other side. Thus, when the two metal joints 3B and 4B are overlapped, the metal joints do not get out of place not only longitudinally (in the span direction) and vertically but also laterally (in the beam direction). When this composition is adopted, if only the metal joint is placed on the other, the metal joints do not get out of place longitudinally, laterally or vertically. Hence extremely simple subsequent fastening operation and so forth.

Incidentally, as to the above-mentioned metal joints 3 and 4, or 3B and 4B, the male-side and female-side metal joints have the same shape so that the metal joints may be used in common. Instead, the male-side and female-side metal joints may have different shapes. In either case, what is required is that each metal joint has the first, second and third contacting surfaces.

Though the above example is the joint structure of a light-steel building, this invention can be used as the joint structure of wooden columns and beams. In such a case, for example, as shown by an imaginary arrow in FIG. 3(B), the male-side metal joint 3 and the female-side metal joint 4 are fixed on the side of the column and the beam, respectively, by means of fastening screws and so on.

In the above example, the joints are metal joints made of steel. The joints may be made of materials other than steel, for example, in the case of the joint structure of a lightweight structure, a molded form such as rigid plastic. Or the joints may be made of metal materials other than steel.

Furthermore, in the above example this invention is applied to the joint portion of a column and a beam. Needless to say, this invention may be applied to the joint portion of other members.

Incidentally, in this invention the inclination angle of the first, second and third contacting surfaces may be set appropriately depending on the size and others of a structure to which this invention is applied.

Figure 4A:
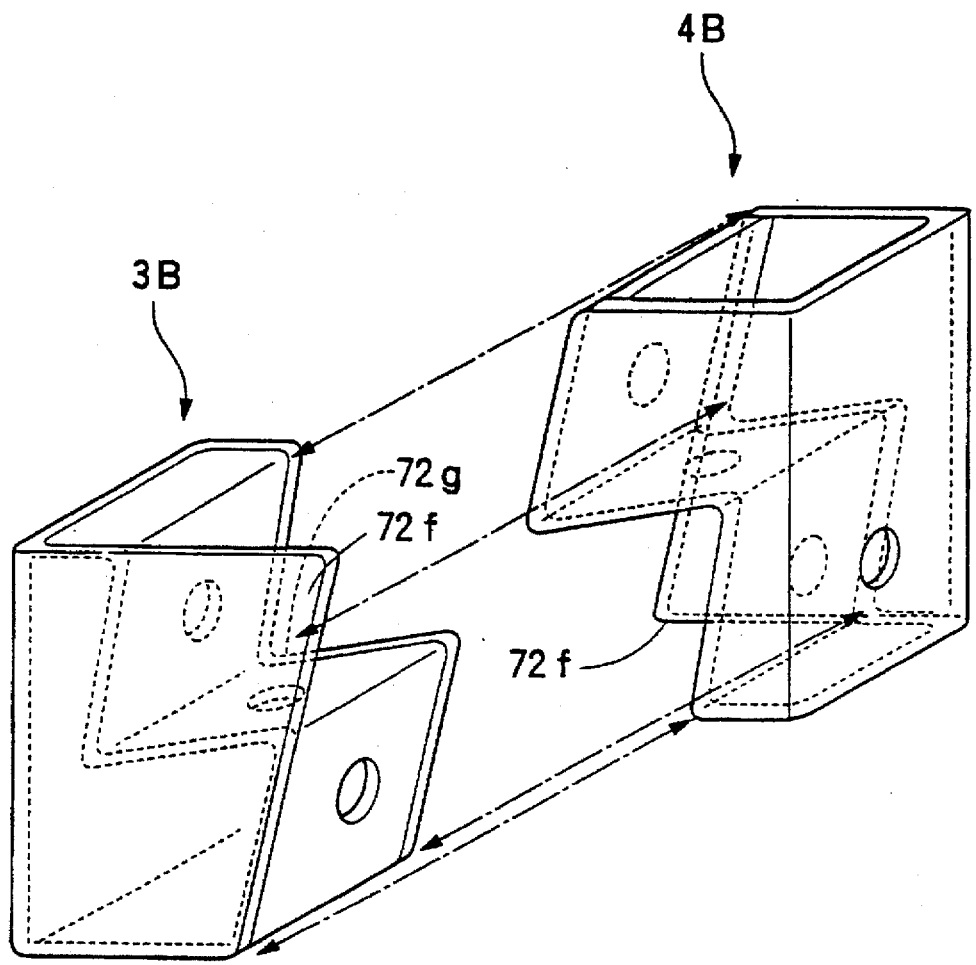
FIGS 4(A) through 4(D) illustrate a modified example of the metal joint in FIG. 1.
Figure 4B:
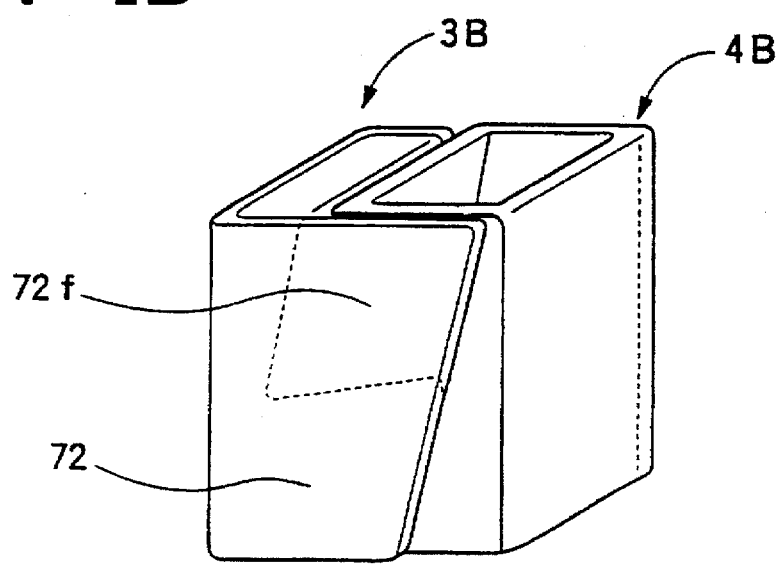
Figure 4C:
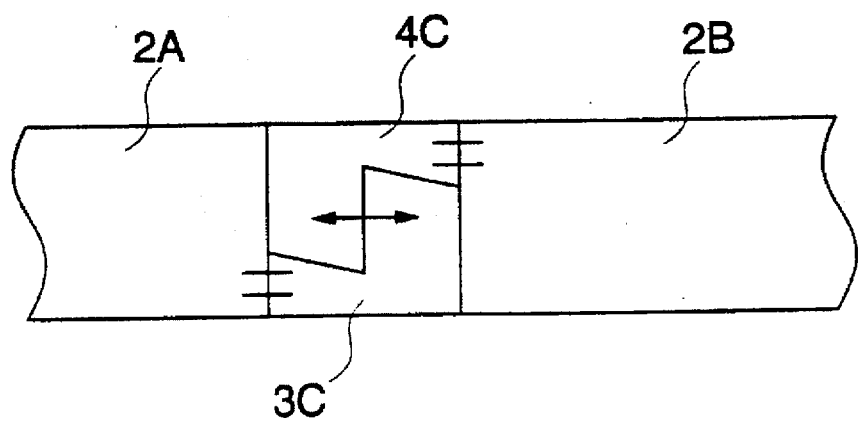
Figure 4D:
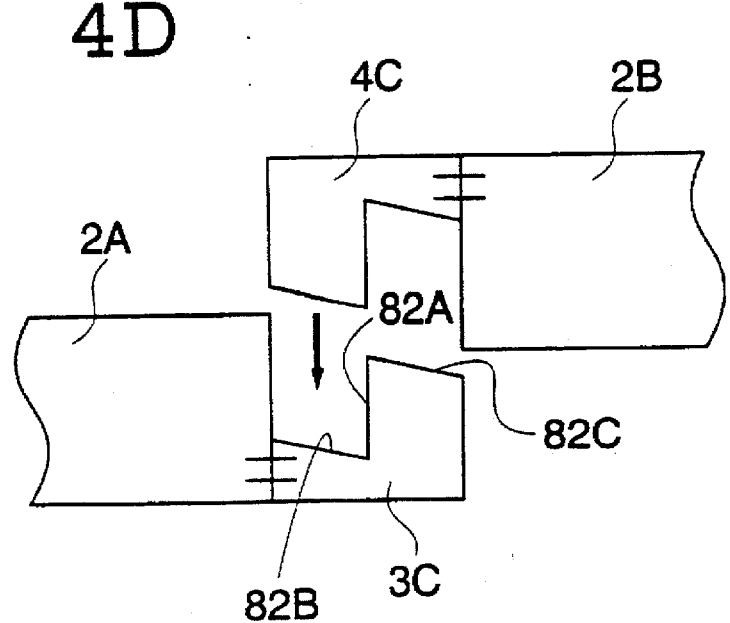

FIGS. 4(C) and (D) show still other metal joints. These metal joints 3C and 4C have a shape appropriate to joint two members linearly. That is, the metal joint 3C has a vertical surface 82A perpendicular to the longitudinal direction of members 2A and 2B; an inclined surface 82C which continues from the upper end of the vertical surface 82A and inclines downward; and an inclined surface 82B which continues from the lower end of the vertical surface 82A and inclines upward.

Accordingly, as shown in FIG. 4(C), when the metal joint 4C on the side of the member 2B is placed from above into the metal joint 3B attached to the other member 2A, the two members 2A and 2B are jointed. In this state, the two members 2A and 2B do not move away along the longitudinal direction. That is, because the vertical surfaces 82c of the metal joints 3C and 4C are engaged, movement like that is prevented.

As described above, in the joint structure of members according to this invention, the male-side joint having the first contacting surface, the second and third contacting surfaces whose inclination angle is set at a given value, the female-side joint having the similar first and third contacting surfaces, and a fastener to fix these joints are used to joint different members. In doing the joint, what is necessary is to put the female-side joint on the male-side joint and fasten the joints, which can be done easily and does not require skill.

Furthermore, according to this invention, when one joint is put on the other, the two joints are prevented from getting out of place by means of an engagement of the first to third contacting surfaces. The joints having a projected wall are particularly advantageous because the two joints are prevented from getting out of place longitudinally, laterally or vertically if only one joint is put on the other.

SECOND EXAMPLE

Next, the joint structure of a precast concrete footing to which this invention is applied will be described.

FIG. 5(A) illustrates the joint structure of a precast concrete footing for T-joints and a precast concrete footing for beams. In this drawing, the reference number 101 is the precast concrete footing for T-joints, while the reference number 102 is the precast concrete footing for beams. The precast concrete footing for T-joints 1 has a pair of upper and lower male-side metal joints 106-1, 106-2, . . . (in the description below these joints are collectively shown by the reference number 6) fixed on three jointing end surfaces 103, 104 and 105 thereof. These joints have the same structure, and may be attached to the footings in advance in the factory, and then may be carried to the building site. Instead, attachment bolts may be projected from the end surfaces 103, 104 and 105 in the factory, and the male-side metal joints 106 are attached to the footings in the building site.

On the other hand, the precast concrete footing for beams 2 has a pair of upper and lower female-side metal joints 108-1, 108-2, . . . (in the description below these joints are collectively shown by the reference number 8) fixed on the jointing end surface 107 thereof. These joints also have the same structure. In addition, in this example, the male-side metal joints 106 and the female-side metal joints 108 have the same shape. Accordingly, the female-side metal joints 108 may be attached to the end surface 107 with the male-side metal joints 106 turned upside down.

FIG. 5(B) illustrates the state in which these precast concrete footings 101 and 102 are jointed. In order to form this state, as shown by a chain line arrow in FIG. 5(A), for example, the beam-side precast concrete footing 102 is lifted, and the female-side metal joint 108 of the end surface 107 thereof is placed immediately above the male-side metal joint 106 of the end surface 103 of the other precast concrete footing 101. After that, if the precast concrete footing 102 is placed, the female-side metal joint 108 is put on the male-side metal joint 106, which is the joint state shown in FIG. 5(B).

After the precast concrete footings are thus jointed, concrete is placed in a gap 109 of the jointed portion of the two footings to unite the jointed portion. This operation, as shown in FIG. 5(C), may be carried out at the same time as the base portion 110 of the continuous footing is placed. Hence, the construction of the united continuous footing.

FIG. 6 is an enlarged view of the above-mentioned male-side metal joint 106 and the female-side metal joint 108. Since these joints have the same shape, the explanation will be focused on the structure of the male-side metal joint 106. The male-side metal joint 106 has a back surface 161 to be fixed on the end surface 103 of the precast concrete footing 101, and left and right sides 162 and 163 extending forward perpendicularly (the longer direction of the footing) from both sides of the back surface 161. In the front of the male-side metal joint 106 there are a contacting surface 164 which inclines so that the front end is higher; an inclined surface 165 which rises upward almost perpendicularly from the back end of the contacting surface 164; and an inclined surface 166 which extends downward almost perpendicularly from the front end of the contacting surface 164.

The female-side metal joint 108 has the same shape as the male-side metal joint 106. In other words, the female-side metal joint 108 has a contacting surface 164 and inclined surfaces 185 and 186, as well as a back surface 181, left and right sides 182 and 183 corresponding to those of the male-side metal joint 106. The female-side metal joint 108, however, is attached to the end surface 107 of the precast concrete footing 102 upside down, contrary to the male-side metal joint 106.

Accordingly, when the female-side metal joint 108 is placed on the male-side metal joint 106 from right above, the contacting surfaces 164 and 184 thereof overlap intimately. At the same time, the inclined surface 186 overlaps the inclined surface 165 closely, while the inclined surface 185 overlaps the inclined surface 166 closely. In such a state, because the contacting surfaces 164 and 184 incline, the precast concrete footings 101 and 102 do not come off in the longer direction of the footing.

Incidentally, as shown in FIG. 6, it is possible to make circular holes 164a and 184a in the center of the contacting surfaces 164 and 184, and to temporarily tighten the male-side metal joint 106 and the female-side metal joint 108 by means of fastening bolts and so forth after the precast concrete footings 101 and 102 are jointed.

Figure 7A:
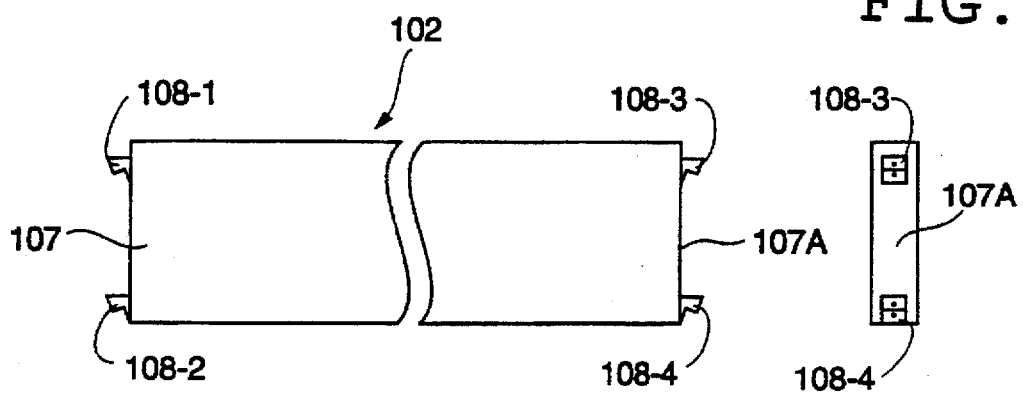
FIGS. 7A and 7B include a front view and a side view of the precast concrete footing for beams.
Figure 7B:
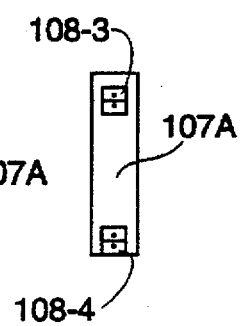

FIG. 7 shows the aforementioned precast concrete footing for beams 102. As shown in this drawing, a pair of upper and lower female-side metal joints 108-1, 108-2 and 108-3, 108-4 are attached to left and right end surfaces 107 and 107A, respectively. In place of the precast concrete footing for beams 102, a footing beam with a steel rectangular framework may be used. After such a footing beam is installed in the site, a decorative panel is placed on its side surface facing the outside of the building. The footing beam of this structure may be provided on both end sides thereof with metal joints.

Figure 8:
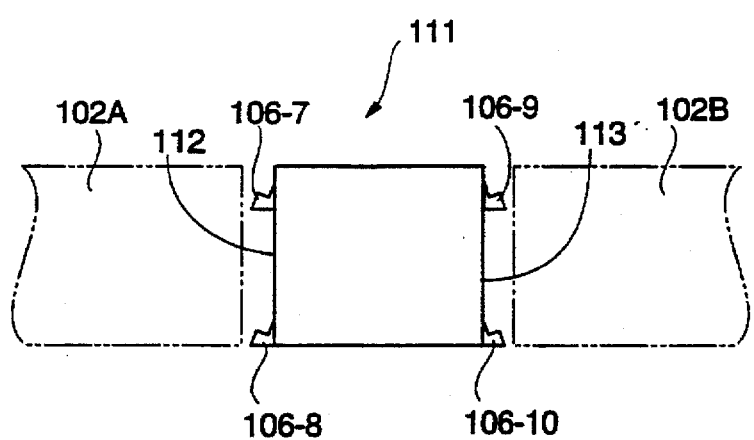
FIG. 8 is a front view of the precast concrete footing for jointing a beam.

In order to joint the precast concrete footing for beams 102 along the longer direction, a precast concrete footing 111 for jointing footing beams as shown in FIG. 8 may be used. The precast concrete footing 111 for jointing beams has a pair of upper and lower male-side metal joints 106-7, 106-8 and 106-9, 106-10 fixed on the left and right end surfaces 112 and 113 thereof, respectively. Accordingly, by using the precast concrete footing 111, as shown by imaginary lines in FIG. 8, it is possible to joint precast concrete footings for beams 102A and 102B on both sides of the precast concrete footing 111 in the longer direction.

FIG. 9 are a front view, a side view and a plan view of the precast concrete footing for T-joints 101 shown in FIG. 5.

FIG. 10, on the other hand, illustrates the precast concrete footing for L-joints 114. The precast concrete footing for L-joints 114 has a pair of upper and lower male-side metal joints 106-11, 106-12 and 106-13, 106-14 fixed on the two end surfaces 115 and 116 thereof, respectively.

If the precast concrete footings 102, 111, 101 and 114 for beams, jointing beams, T-joints and L-joints respectively as shown in FIGS. 7, 8, 9 and 10 are prepared, it is possible to build continuous footings for general houses by combining and jointing these precast concrete footings.

(Modified Example of the Second Example)

Incidentally, in the above metal joints 106 and 108, the male- and female-side metal joints have the same shape so that those metal joints may be used in common. Instead, the male- and female-side metal joints may have different shapes. In either case, what is required is that those joints have contacting surfaces 164 and 184 which can be overlapped closely with each other.

In addition, in the above example the joints are metal joints made of steel. The joints may be made of materials other than steel, for example, in the case of the joint structure of a lightweight structure, a molded form such as rigid plastic. The joints may be made of metal materials other than steel. Or, the joints may be made of concrete.

As described above, in the joint structure of the precast concrete footing according to this invention, in which at least one male-side joint is fixed on the jointing end surface of one precast concrete footing, and at least one female-side joint is fixed on the jointing end surface of the other precast concrete footing, the female-side joint is put on the male-side joint when the female-side precast concrete footing is placed from above. In addition, each joint has an inclined contacting surface which can overlap another closely. When these contacting surfaces overlap, the two jointed precast concrete footings do not come off in the longer direction. Accordingly, the precast concrete footings can be jointed in a simple operation. Hence, easy construction of a continuous footing by means of a precast concrete footing.

I claim:
1. A joint structure, comprising:
   a male-side joint,
   a female-side joint,
   said male-side joint has a first contacting surface, a second contacting surface which continues from a back side of the first contacting surface and extends at an angle of less than 90° with respect to the first contacting surface, and a third contacting surface which continues from a front side of the first contacting surface and extends at an angle of 270° or more with respect to the first contacting surface, said female-side joint has a first, a second, and a third contacted surface which correspond to said first, second, and third contacting surfaces of the male-side joint, respectively, these contacted surfaces are shaped so as to closely correspond to the first, second, and third contacting surfaces, a fastener for fastening said male-side joint to said female-side joint when the first, second, and third contacting surfaces of the male-side joint are put close to the first, second, and third contacted surfaces of the female-side joint, wherein said male-side joint has left and right sidewalls extending perpendicularly from both sides of said first, second, and third contacting surfaces, and a projected wall which projects from at least one of said first, second, and third contacting surfaces, the female-side joint has left and right sidewalls extending perpendicularly from both sides of the first, second, and third contacted surfaces, and a projected wall which projects from at least one of the first, second, and third contacted surfaces, and when said female-side joint is put closely on said male-side joint, the projected wall of said male-side joint is engaged with one of the left and right sidewalls of said female-side joint where the female-side joint projected wall is not provided, and the projected wall of said female-side joint is engaged with one of the left and right sidewalls of said male-side joint where the male-side joint projected wall is not provided.

2. The joint structure of claim 1, wherein the male-side joint includes means for fixing the male-side joint to a first member, and the female-side joint includes means for fixing the female-side joint to a second member so that the first member may be jointed to the second member.

* * * * *